Aug. 20, 1968

M. A. JARVIS ET AL 3,397,785

WATER PURIFYING APPARATUS EMPLOYING STACKED
ASSEMBLY OF REVERSE OSMOSIS CELLS

Filed July 20, 1965

INVENTOR.
MARVIN A. JARVIS
JEROME F. STRATMAN

BY Edward O. Ansell
George J. Netter
ATTORNEYS

INVENTOR.
MARVIN A. JARVIS
JEROME F. STRATMAN
BY
ATTORNEYS

INVENTOR
MARVIN A. JARVIS
JEROME F. STRATMAN
BY Edward O. Ansell
George J. Netter
ATTORNEYS

United States Patent Office 3,397,785
Patented Aug. 20, 1968

3,397,785
WATER PURIFYING APPARATUS EMPLOYING STACKED ASSEMBLY OF REVERSE OSMOSIS CELLS
Marvin A. Jarvis, Santa Ana, and Jerome F. Stratman, Cypress, Calif., assignors to Aerojet-General Corporation, El Monte, Calif., a corporation of Ohio
Filed July 20, 1965, Ser. No. 473,375
9 Claims. (Cl. 210—125)

ABSTRACT OF THE DISCLOSURE

A reverse osmosis, home water purification apparatus comprising a stack of spaced-wall-type purification cells, each cell comprising two semipermeable membranes backed by absorbent layers; the stack being disposed in a purified water chamber and communicating therewith through the absorbent layers; the stack being fed through a float controlled valve with the float disposed in the purified water chamber.

---

The present invention relates generally to apparatus for the purification or demineralization of water, and, more particularly, to the provision of such purification equipment adaptable for use in the average home.

In view of the increasing possibility in recent years of pollution of drinking water supplies by insecticides, detergents, and waste products there has been a growing demand for additional water purification means that are suitable for use in the home. In the larger urban areas the desire for water of exceptional purity can usually be satisfied through the purchases of so-called bottled water. However, in the case of smaller communities and outlying areas bottled water may be difficult, or impossible, to obtain. In any event, providing commercially bottled water in sufficiently large quantities for the average home can be an important factor of cost.

It is therefore a primary aim and purpose of the present invention to provide apparatus for converting mineralized water into a purified form.

A further object of the invention is the provision of a water purification unit adapted for demineralizing or purifying water that in its orginal state has a relatively low mineral content.

A further object of the invention is the provision of water purification apparatus for operation on a relatively low hydraulic pressure.

Still another object is the provision of home water purification equipment utilizing a reverse-osmosis membrane as a basic operative element.

Another object is the provision of water purification apparatus having a long operational life requiring little maintenance and which is relatively simple and inexpensive to manufacture.

Other objects and advantages of the invention will be manifest to those skilled in the art when referring to the accompanying drawings.

The basic principle on which the present invention relies to achieve demineralization or purification of water is what is frequently termed the "reverse-osmosis" effect. By this technique, special membranes, or films, are used which are porous to the extent that they permit ready passage of fresh water molecules therethrough, while mineral as well as other foreign materials are not able to pass, and, in a sense, are filtered out. Some of the factors that determine the rate of purification obtainable by this technique are: (a) the concentration of solutes in the water; (b) the physical structure of the membrane or film; (c) the chemical nature of the membrane or film; (d) the degree of turbulence of the mineral containing water in contact with the membrane; and (e) the hydraulic pressure on the membrane.

Briefly, on the action of such a demineralizing membrane, if the membrane is disposed with relatively pure water on one side and mineralized water on the other it will be found that the pure water will tend to permeate the membrane towards the mineralized water with practically no movement in the opposite direction. However, if a sufficiently great hydraulic, or osmotic, pressure is exerted on the mineralized water, the fresh water permeation is stopped and fresh water contained within the mineralized water as a result of the high osmotic pressure makes its way through the membrane increasing the quantity of fresh water. Suitable membranes for present purposes can be made from cellulose acetate as a basic material. A suitable process for construction of one such membrane is that set forth in U.S. Patent to S. Loeb et al. No. 3,133,132.

The apparatus to be described at this time basically serves the purpose of treating water with a relatively low mineralized content to remove even that small amount of undesirable material that may be present. That is, the equipment contemplated here is not contemplated as having the primary utility of converting sea water or other water with a high mineralized content to fresh water, but rather the purifying of water having a low foreign matter content to the degree usually found to exist in so-called tap water. As will be seen in the description that follows, the low mineral content of the source water is advantageous in that it permits a correspondingly lower osmotic pressure that must be applied to achieve purification.

Figure 1:
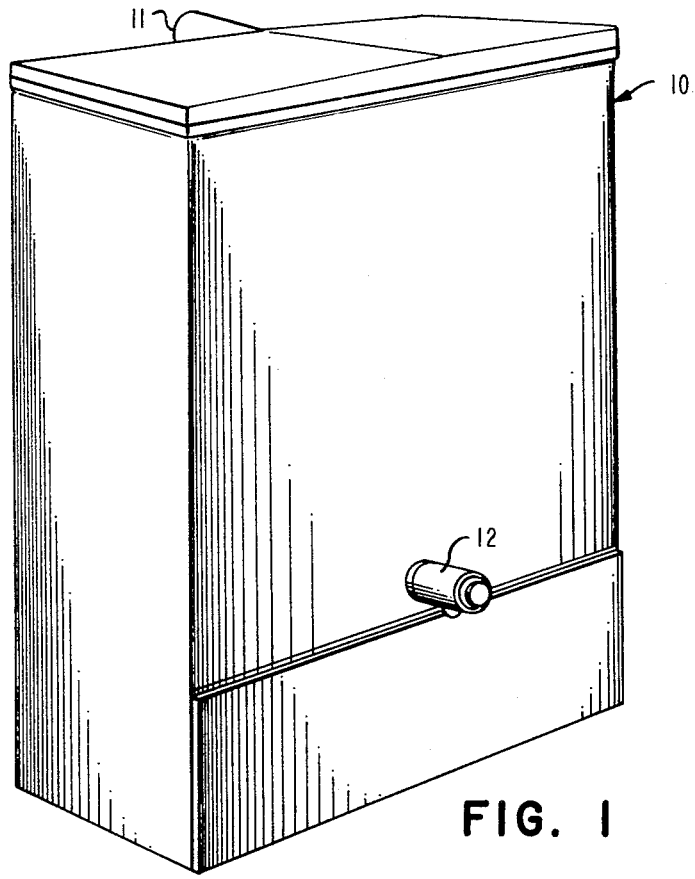
FIGURE 1 is an overall perspective view of the invention as included within a special purified water tank or housing.

FIGURE 1 illustrates the water purification unit of the present invention in its overall outward appearance. It is seen to comprise a generally rectangular structure or housing 10 having a tap water inlet means 11 and a fresh water faucet or tap 12 from which the purified water is taken. As will be made clear the structure 10, in addition to including purification or demineralizing equipment also includes storage capabilities such that a ready supply of purified water is available at all times.

Figure 2:
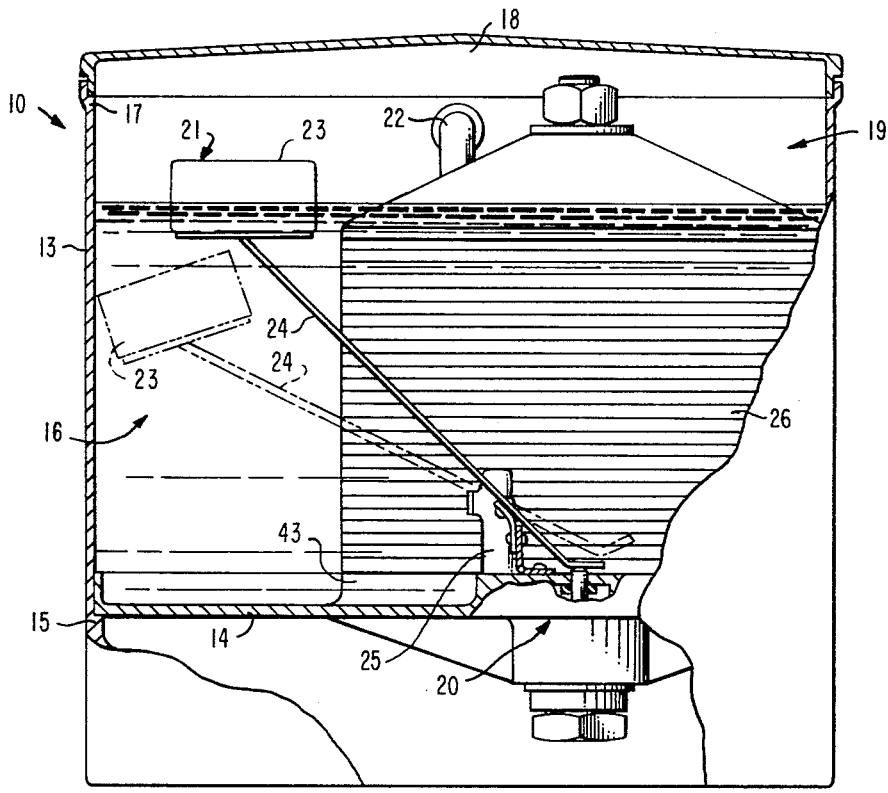
FIGURE 2 is a partially sectional view of the invention of FIGURE 1 illustrating the major features of the purification unit.

From the cutaway illustration of FIGURE 2 it is seen that the housing 10 of the purification unit comprises an outer shell formed by sidewalls 13. A raised floor 14 is carried by flange 15 and is sealingly connected to the sidewalls 13 for providing a watertight containing space or chamber 16. The upper end portions of the sidewalls 13 are provided with an inner flange 17 for receiving a cover or lid 18 in a tightly fitting arrangement.

The basic water treating apparatus illustrated in its entirety generally at 19 is mounted on the raised floor 14 within the chamber 16 as shown. It is the operation generally that water to be treated enters the purification apparatus 19 at the bottom thereof via an inlet valve means 20 to which the tap water inlet means 11 is connected (not shown), and purified water is emptied into the chamber 16 in surrounding relationship to the purification apparatus 19 itself. A float control 21 associated wtih the inlet valve 20 serves to prevent addition of further water to be purified to the apparatus when the purified water in the chamber 16 reaches some predetermined level.

More particularly, the float control 21 comprises a float 23 and a lever arm 24 attached to the float, the extremity of which is formed for being received in contacting relationship with actuating portions of the inlet valve 6. Fulcrum support means 25 for the lever arm 24 are mounted adjacent the apparatus 19 on the floor 14. Operation of the float control is self-evident in that as the purified water rises in the chamber 16, the float also rises moving lever arm 24 to shut off the inlet valve 20. As purified water is used the float sinks accordingly and when a lower limit is reached the valve means is released and water to be purified can then be fed into the purification apparatus 19 through the open inlet valve 20.

Still referring to FIGURE 2 the purification apparatus 19 is seen to consist grossly of a plurality of vertically stacked plate-like members or cells 26 which are of substantially identical construction. Each cell 26 has at least one osmotic membrane for accommodating the passage of pure water therethrough while restraining and confining the mineral material.

Figure 5:
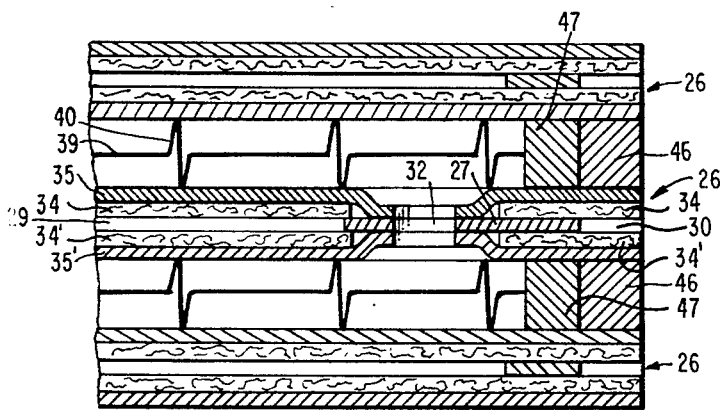
FIGURE 5 is a greatly enlarged, fragmentary longitudinal sectional view of portions of the purification cell assembly of FIGURES 3 and 4.
Figure 4:
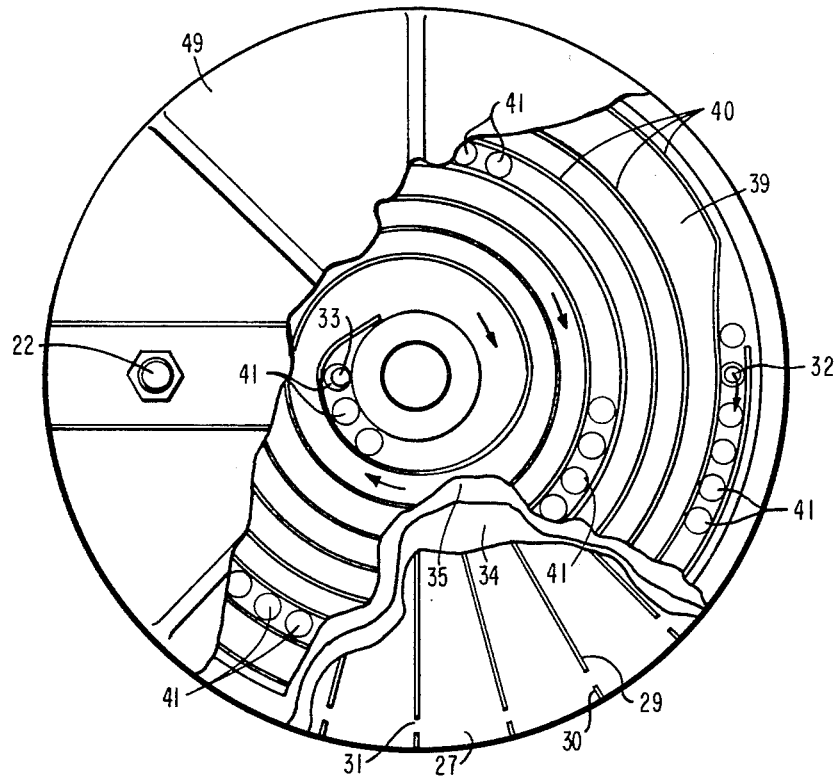
FIGURE 4 is a plan view of the stacked assembly of purification cells shown in FIGURE 3, and partially broken away to show details of construction.
Figure 3:
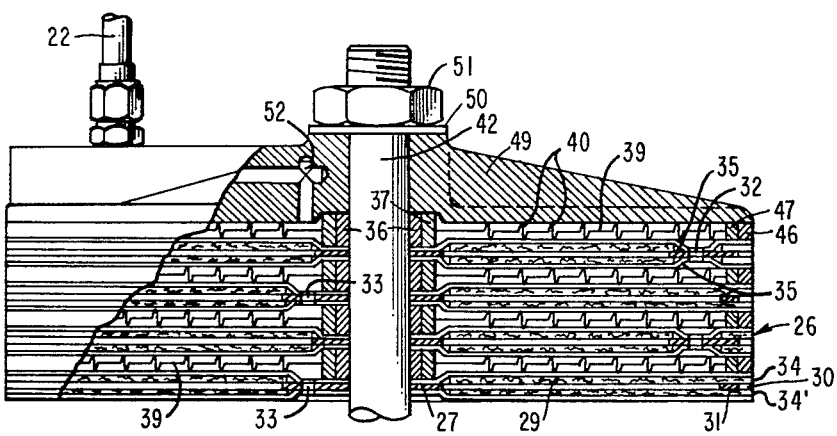
FIGURE 3 is a longitudinal sectional view, partially shown in elevation, and illustrating the stacked assembly of purification cells that is of prime importance to the unit of FIGURES 1 and 2.

With simultaneous reference to FIGURES 3–5 a discussion of the features of the novel cell 26 of the invention will be entered into. Each cell 26 includes an innermost support plate 27. The innermost support plate 27 is impervious to liquid and comprises a thin metallic circular disc having a centrally arranged opening and a plurality of perforations or slots 29 extending radially from an inner marginal portion which bounds the central opening to a point just short of the outer periphery. Respective notches 30 are cut inwardly from the outer edge of the disc along the same lines as the perforations 29 leaving a small amount of supporting material 31 between the corresponding notches and perforations. The support plates are of two distinct types: (1) in which an opening 32 is provided in the margin adjacent the outer periphery; and (2) where a similar opening 33 is provided in the margin adjacent the central opening. The purpose of these openings and the reason for their specific placement in the respective support plates 27 will be brought out below in the discussion of the detailed operation. Although other materials may be found to be equally useful for constructing support plates of this kind, best results have been obtained by fabricating such plates from thin bronze sheeting of a thickness on the order of 0.010 inch.

Similarly shaped disc-like layers 34 and 34' of an absorbent fluid conductive material are respectively disposed in intimate contacting relationship to each side of the support plate 27. The dimensions of these layers relative to the support plate are such that the corresponding openings are larger than those of the associated support plate so that when disposed in registry on the support plate a margin of the support plate material exists at each opening. Although other materials may be found satisfactory, an excellent one of this purpose is a resin impregnated filter paper available commercially under the trade designation Netone 5, No. 2602, manufacture by the National Filter Media Company. A layer of filter paper of this construction has both the desirable property of being able to readily transmit liquids along the general plane of the layer, and also to be able to maintain this property in use and not "crush" closing the fluid conducting spaces.

Over each absorbent layer 34, 34' there is provided a corresponding osmotic membrane 35 and 35', respectively. These membranes are of the general type referred to earlier herein, and described in the cited Loeb patent for effecting a selective filtering by so-called reverse-osmosis. The membranes are applied in such a manner as to be in continuous intimate contacting relation with the associated absorbent layers. Also, in the region of the central opening of the support plate 27, the membranes 35, 35' extend radially inwardly beyond the edges of both the absorbent layers 34, 34' in overlying, directly contacting relation to the opposite sides of the inner marginal portion of the support plate 27. With respect to each of the support plates 27 which have an opening 33 in the margin thereof adjacent the central opening, it will be understood that corresponding openings are provided in the membranes 35, 35' associated therewith in registration with the opening 33 in the respective support plate 27. Similarly, with respect to each of the support plates 27 which have an opening 32 in the margin thereof adjacent the outer periphery of the support plate 27, corresponding openings are provided in the membranes 35, 35, associated therewith in registration with the opening 32 in the respective support plate 27, as best seen in FIGURE 5.

As shown in FIGURE 3, the individual cells 26 are arranged in a stacked relationship such that the respective support plates 27 of successive cells 26 alternate between the type having the inner opening 33 in the margin thereof adjacent the central opening and the type having the outer opening 32 in the margin thereof adjacent the outer periphery. Adjacent cells 26 are maintained in a spaced, sealed relationship with respect to each other such that the proximally-related membranes of adjacent cells 26 are spaced apart. To this end, an inner annular washer or spacer member 36 constructed of a liquid impervious material is interposed between adjacent cells 26 at the inner marginal portions thereof so as to engage the inner portions of the proximally-related membranes of the adjacent cells, and an inner annular seal 37 is disposed in surrounding relation to the inner spacer member 36 with its opposite ends in sealing engagement with the proximally-related membranes of adjacent cells 26. In like manner, an outer annular washer or spacer member 46 constructed of a liquid impervious material and an underlying outer annular seal 47 associated therewith are interposed between adjacent cells 26 at the outer marginal portions thereof. The outer spacer member 46 and the outer annular seal 47 respectively engage outer portions of the proximally-related membranes of the adjacent cells to maintain a spaced, sealed relationship therebetween. The sets of inner and outer spacer members 36, 46 and annular seals 37, 47 between each pair of adjacent cells 26 are arranged in concentric relationship with the respective axial lengths of the outer spacer member 46 and annular seal 47 being less than the axial lengths of the inner spacer member 36 and annular seal 37. In this connection, the outer peripheral edges of the support plate 27, the absorbent layers 34, 34', and the membranes 35, 35' comprising each respective cell 26 are arranged in substantially flush relationship in contrast to the previously described relationship at the inner marginal portion of the cell 26 where the absorbent layers 34, 34' do not extend radially inwardly as far as the support plate 27 and the membranes 35, 35', thereby decreasing the axial thickness of the inner marginal portion of the cell 26.

With reference now simultaneously to FIGURES 3, 4 and 5, it is seen that a fluid controlling disc 39 is provided in the space between each pair of adjacent cells 26. Walls or ridges 40 on the disc 39 form a generally spiral (FIGURE 4) fluid conducting path or conduit for a purpose that will be discussed below. The base of disc 39 is also provided with a plurality of openings or passageways 41 disposed between the walls 40. As will be clearer after the discussion of overall operation given later herein, the spiral-shaped path formed by the walls 40 and the passageways 41 cooperate to direct water to be purified through the apparatus and bring it into contact with substantially all of the exposed surfaces of the purifying membranes 35 and 35'. A fully satisfactory disc 39 can be constructed from any one of a number of different plastic materials, or can be stamped out of sheet metal, for example, with its surface treated appropriately to resist corrosion by water.

The first step in forming a stacked array of cells 26 is to anchor (not shown) a tie bolt 42 to a pedestal portion 43 of the floor 14. A purification cell 26 is disposed with the bolt passing htrough the central opening thereof, and a suitable O-ring type of sealing means 44 carried within a groove in the pedestal provides the necessary edge seal therefor. Next, a fluid controlling disc 39 is brought down over the tie bolt onto the purification cell 26. Respective sets of inner and outer spacer members 36, 46 and annular seals 37, 47 are then placed in position. The spacer members 36, 46 maintain the axial thickness of the space between the first cell 26 and a second cell 26 to be subsequently disposed over the disc 39, and the seals 37, 47 seal the space as so formed at the radially inner and outer extremities of the fluid controlling disc 39. This stacking arrangement is continued until the desired number of cells 26 is obtained. Over the stack is placed a special cover 49 that is secured to the stack by a washer 50 and nut 51 threadedly received upon the tie bolt.

Figure 6:
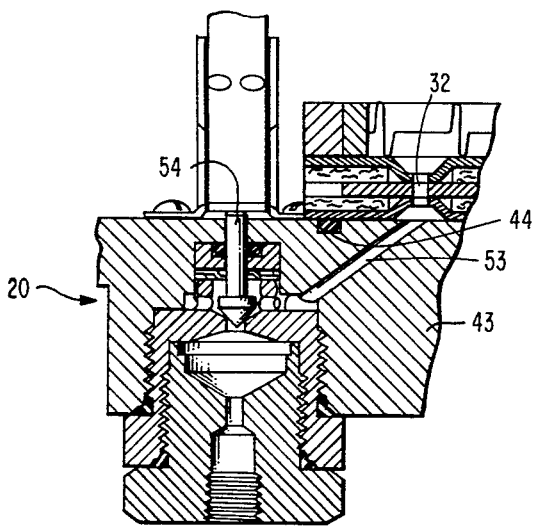
FIGURE 6 shows a sectional enlarged view of an on-off control valve comprising a component of the purification unit illustrated in FIG. 2.

In operation, water to be treated enters into the apparatus 19 via the valve means 20. From the valve means 20, the water to be treated is directed into the stack of cells 26 through the inlet passageway 53 (FIGURE 6) provided in the pedestal portion 43. Some unpurified water may contact the outer surface of the membrane of the first or lowest cell 26 in the stack which membrane is seated on the pedestal portion 43 in abutting relation thereto. However, the unpurified water is generally directed through the outer opening 32 which is provided in the first cell 26 and into the space between the first cell 26 and the cell 26 adjacent thereto. The unpurified water is then directed along the spiral paths defined by the disc 39 which is received in the space between the adjacent cells 26. In this connection, the unpurified water is permitted to flow on both sides of the disc 39 by the openings 41 in the disc 39. The proximally-related membranes of the adjacent cells 26 are thereby exposed to the unpurified water. It will be understood that the unpurified water subsequently passes through the complete stack of cells 26 in the same manner, alternately flowing through the inner opening 33 provided in the support plate 27 of one cell 26 and then through the outer opening 32 provided in the support plate 27 of the next successive cell 26 and repeating this sequence throughout the complete stack of cells 26. Thus, the unpurified water passes through each of the respective spaces provided between successive cells 26 until it is discharged as a concentrated waste liquid from the purification apparatus 19 through a channel 52 formed in the cover 49. The concentrated waste liquid is then removed from the housing 10 through an outlet drain conduit 22 which is connected to the cover 49 and in communication with the channel 52. The outlet drain conduit extends through the outer housing shell and may be connected to a suitable sump (not shown). As the water to be treated comes into contact with the exposed surfaces of the membranes, permeation by fresh water is effected. The fesh water is transferred along the absorbent substrates 34, 34' of the respective cells 26 to the outermost peripheral edges where it empties directly into the chamber 16. In this connection, it will be understood that the radial slots 29 and notches 30 formed in the support plate 27 of each cell 26 serve to communicatively connect the two absorbent layers 34, 34' of the cell 26 such that the fresh water collected in the respective absorbent layers 34, 34' may be commingled as it is transferred to the outer peripheral edges thereof for delivery to the chamber 16. This process continues until the float 23 in the chamber 16 is raised sufficiently high to cause the lever arm 24 to move the actuating member 54 of valve 20 into the closed position to prevent the admission of unpurified water to the purification apparatus 19 until the valve 20 is opened by downward movement of the float 23 as the purified water is withdrawn from the chamber 16 in the manner previously described.

The apparatus of the present invention by the reverse osmosis process is highly effective in removing foreign material from water, where the concentration of the foreign material is relatively small. Exemplary of some of the many things that can be removed in this manner are chemicals of great variety including detergents, bacteria, viruses and radioactive substances.

While a particular embodiment of the invention has been illustrated and described, it will be understood that the invention should not be construed as being limited thereto, but only to the scope of the claims.

We claim:

1. A purification cell for demineralizing liquids by reverse osmosis comprising:

a disc-like support plate of liquid impervious material having opposite annular side surfaces, a pair of disc-like layers of liquid-conducting absorbent material respectively mounted on the opposite annular side surfaces of said support pltae in overlying covering relation to at least a substantial portion of the respective surface areas of the opposite annular side surfaces of said support plate, a pair of annular reverse osmosis membranes respectively disposed in overlying relation to each of the layers of liquid-conducting absorbent material on the opposite annular side surfaces of said support plate and respectively covering the entire side surface areas of said layers of liquid-conducting absorbent material, the radially inner marginal portion of said support plate and the radially inner marginal portions of said pair of reverse osmosis membranes extending radially inwardly beyond said pair of layers of liquid-conducting absorbent material, the radially inner marginal portions of said pair of reverse osmosis membranes being directly secured to the respective radially inner marginal portions of the opposite annular side surfaces of said support plate, the outer peripheral edges of said support plate, said pair of layers of liquid-conducting absorbent material, and said pair of reverse osmosis membranes being disposed in substantially flush relationship, said support plate, said pair of layers of liquid-conducting absorbent material, and said pair of reverse osmosis membranes cooperating to define a unitary composite disc structure, said unitary composite disc structure being provided with an opening extending therethrough, and said opening being located between the inner and outer peripheral edges of the unitary composite disc structure and having a boundary comprising only portions of said support plate and said pair of reverse osmosis membranes.

2. A purification cell for demineralizing liquids by reverse osmosis comprising:

a disc-like support plate of liquid impervious material having opposite annular side surfaces, a pair of disc-like layers of liquid-conducting absorbent material respectively mounted on the opposite annular side surfaces of said support plate in overlying covering relation to at least a substantial portion of the respective surface areas of the opposite annular side surfaces of said support plate, a pair of annular reverse osmosis membrances respectively disposed in overlying relation to each of the layers of liquid-conducting absorbent material on the opposite annular side surfaces of said support plate and respectively covering the entire side surface areas of said layers of liquid-conducting absorbent material, the radially inner marginal portion of said support plate and the radially inner marginal portions of said pair of reverse osmosis membranes extending radially inwardly beyond said pair of layers of liquid-conducting absorbent material, the radially inner marginal portions of said pair of reverse osmosis membranes being directly secured to the respective radially inner marginal portions of the opposite annular side surfaces of said support plate, the outer peripheral edges of said support plate, said pair of layers of liquid-conducting absorbent material, and said pair of reverse osmosis membranes being disposed in substantially flush relationship, said support plate being provided with an opening therethrough which is located in one of the radially inner and outer marginal portions of the support plate, said pair of layers of liquid-conducting absorbent material and said pair of reverse osmosis membranes being respectively provided with openings therethrough in registration with the opening in said support plate, the openings in said pair of layers of liquid-conducting absorbent material being of enlarged size as compared to the openings in said pair of reverse osmosis membranes and the opening in said support plate, the respective portions of said pair of reverse osmosis membranes bounding said openings therein extending into the respective enlarged opening in the layer of liquid-conducting absorbent material corresponding thereto and being directly secured to the respective surface portions of said support plate bounding the opening therethrough, and said support plate, said pair of layers of liquid-conducting absorbent material, and said pair of reverse osmosis membranes cooperating to define a unitary composite disc structure.

3. A purification cell for demineralizing liquids by reverse osmosis as defined in claim 2, wherein said support plate is provided with a plurality of circumferentially spaced radial slots therethrough, the radially inner ends of said slots being located radially outwardly with respect to the radially inner marginal portion of said support plate to which said pair of reverse osmosis membranes are directly secured, and said slots serving as elongated passages providing communication between said pair of layers of liquid-conducting absorbent material disposed on the opposite sides of said support plate.

4. A purification apparatus for demineralizing liquids by reverse osmosis comprising:

a plurality of purification cells arranged in stacked relationship, each of said cells comprising a disc-like support plate of liquid impervious material having opposite annular side surfaces, a pair of disc-like layers of liquid-conducting absorbent material respectively mounted on the opposite annular side surfaces of said support plate in overlying covering relation to at least a substantial portion of the respective surface areas of the opposite annular side surfaces of said support plate, a pair of annular reverse osmosis membranes respectively disposed in overlying relation to each of the layers of liquid-conducting absorbent material on the opposite annular side surface of said support plate and respectively covering the entire side surface areas of said layers of liquid-conducting absorbent material, the outer peripheral edges of said support plate, said pair of layers of liquid-conducting absorbent material, and said pair of reverse osmosis membranes being disposed in substantially flush relationship, and said support plate, said pair of layers of liquid-conducting absorbent material, and said pair of reverse osmosis membranes cooperating to define a unitary composite disc structure;

means axially spacing adjacent cells apart and cooperating therewith to define a spaced area extending radially between the proximal membranes of respective adjacent cells, means holding said plurality of cells together in a stacked assembly of cells, and said stacked assembly of cells being provided with a fluid passage means extending therethrough through which liquid to be demineralized may flow for successively entering respective spaced areas defined between adjacent cells so as to expose the membranes of said cells to the liquid to be demineralized, whereby purified liquid from the liquid to be demineralized permeates the membranes to be absorbed by the layers of liquid-conducting absorbent material and transmitted therethrough to the outer peripheral edges thereof to be discharged as a product liquid from each of the respective cells.

5. A purification apparatus for demineralizing liquids by reverse osmosis as defined in claim 4, wherein said holding means comprises end members disposed at the opposite ends of said stacked assembly of cells, a centrally disposed shaft extending axially through said stacked assembly of cells and said end members at the respective opposite ends of said stacked assembly of cells, and means operably associated with said shaft to apply clamping pressure to said stacked assembly of cells by decreasing the axial distance between said end members.

6. A purification apparatus for demineralizing liquids by reverse osmosis as defined in claim 4, further including a housing in which said stacked assembly of cells is disposed, and at least a substantial portion of said housing being spaced radially outwardly with respect to said stacked assembly of cells to define a chamber therebetween in which product liquid discharged from each of the respective cells is received.

7. A purification apparatus for demineralizing liquids by reverse osmosis as defined in claim 6, further including means responsive to the level of product liquid in said chamber for controlling the admission of liquid to be demineralized into said stacked assembly of cells.

8. A purification apparatus for demineralizing liquids by reverse osmosis comprising:

a plurality of purification cells arranged in stacked relationship, each of said cells comprising a disc-like support plate of liquid impervious material having opposite annular side surfaces, a pair of disc-like layers of liquid-conducting absorbent material respectively mounted on the opposite annular side surfaces of said support plate in overlying covering relation to at least a substantial portion of the respective surface areas of the opposite annular side surfaces of said support plate, a pair of annular reverse osmosis membranes respectively disposed in overlying relation to each of the layers of liquid-conducting absorbent material on the opposite annular side surfaces of said support plate and respectively covering the entire side surface areas of said layers of liquid-conducting absorbent material, the radially inner marginal portion of said support plate and the radially inner marginal portions of said pair of reverse osmosis membranes extending radially inwardly beyond said pair of layers of liquid-conducting absorbent material, the radially inner marginal portions of said pair of reverse osmosis membranes being directly secured to the respective radially inner marginal portions of the opposite annular side surfaces of said support plate, the outer peripheral edges of said support plate, said pair of layers of liquid-conducting absorbent material, and said pair of reverse osmosis membranes being disposed in substantially flush relationship, said support plate, said pair of layers of liquid-conducting absorbent material, and said pair of reverse osmosis membranes cooperating to define a unitary composite disc structure, said unitary composite disc structure being provided with a passage extending axially therethrough which is located in one of the radially inner and outer marginal portions of said unitary composite disc structure, and said passage having a boundary comprising only portions of said support plate and said pair of membranes;

means axially spacing adjacent cells apart and cooperating therewith to define a spaced area extending radially between the proximal membranes of respective adjacent cells, means holding said plurality of cells together in a stacked assembly of cells, the respective axially extending passages through said cells being alternately located in the radially inner marginal portion of one cell and in the radially outer marginal portion of the cell adjacent thereto, and said axially extending passages through said cells providing communication between the respective spaced areas defined between adjacent cells such that liquid to be demineralized may sequentially flow through respective axially extending passages for successively entering respective spaced areas defined between adjacent cells so as to expose the membranes of said cells to the liquid to be demineralized, whereby purified liquid from the liquid to be demineralized permeates the membranes to be absorbed by the layers of liquid-conducting absorbent material and transmitted therethrough to the outer peripheral edges thereof to be discharged as a product liquid from each of the respective cells.

9. A purification apparatus for demineralizing liquids by reverse osmosis comprising:

a plurality of purfiication cells arranged in stacked relationship, each of said cells comprising a disc-like support plate of liquid impervious material having opposite angular side surfaces, a pair of disc-like layers of liquid-conducting absorbent material respectively mounted on the opposite annular side surfaces of said support plate in overlying covering relation to at least a substantial portion of the respective surface areas of the opposite annular side surfaces of said support plate, a pair of annular reverse osmosis membranes respectively disposed in overlying relation to each of the layers of liquid-conducting absorbent material on the opposite annular side surfaces of said support plate and respectively covering the entire side surface areas of said layers of liquid-conducting absorbent material, the radially inner marginal portion of said support plate and the radially inner marginal portions of said pair of reverse osmosis membranes extending radially inwardly beyond said pair of layers of liquid-conducting absorbent material, the radially inner marginal portions of said pair of reverse osmosis membranes being directly secured to the respective radially inner marginal portions of the opposite annular side surfaces of said support plate, the outer peripheral edges of said support plate, said pair of layers of liquid-conducting absorbent material, and said pair of reverse osmosis membranes being disposed in substantially flush relationship, said support plate being provided with an opening therethrough which is located in one of the radially inner and outer marginal portions of the support plate, said pair of layers of liquid-conducting absorbent material and said pair of reverse osmosis membranes being respectively provided with openings therethrough in registration with the opening in said support plate, the openings in said pair of layers of liquid-conducting absorbent material being of enlarged size as compared to the openings in said pair of reverse osmosis membranes and the opening in said support plate, the respective portions of said pair of reverse osmosis membranes bounding said openings therein extending into the respective enlarged pening in the layer of liquid-conducting absorbent material corresponding thereto and being directly secured to the respective surface portions of said support plate bounding the opening therethrough to define a passage extending axially through said cell located in one of the radially inner and outer marginal portions thereof, and said support plate, said pair of layers of liquid-conducting absorbent material, and said pair of reverse osmosis membranes cooperating to define a unitary composite disc structure;

means axially spacing adjacent cells apart and cooperating therewith to define a spaced area extending radially between the proximal membranes of respective adjacent cells, means holding said plurality of cells together in a stacked assembly of cells, the respective axially extending passages through said cells being alternately located in the radially inner marginal portion of one cell and in the radially outer marginal portion of the cell adjacent thereto, and said axially extending passages through said cells providing communication between the respective spaced areas defined between adjacent cells such that liquid to be demineralized may sequentially flow through respective axially extending passages for successively entering respective spaced areas defined between adjacent cells so as to expose the membranes of said cells to the liquid to be demineralized, whereby purified liquid from the liquid to be demineralized permeates the membranes to be absorbed by the layers of liquid-conducting absorbent material and transmitted therethrough to the outer peripheral edges thereof to be discharged as a product liquid from each of the respective cells.

(References on following page)

References Cited

UNITED STATES PATENTS

| | | | |
|---|---|---|---|
| 2,146,260 | 2/1939 | Kirgan | 210—116 |
| 2,597,907 | 5/1952 | Steiner et al. | 55—158 |
| 2,864,507 | 12/1958 | Isreeli | 210—321 |
| 3,083,834 | 4/1963 | Pall | 210—343 |
| 3,133,132 | 5/1964 | Loeb et al. | 210—321 |
| 1,825,631 | 9/1931 | Horvath | 210—23 |

FOREIGN PATENTS 58,232  5/1953  France.

OTHER REFERENCES

Longmore, The Lancet, "A Portable Artificial Kidney," Sept. 3, 1960, pp. 527–529.

Progress Report No. 86, "Design and Construction of a Desalination Pilot Plant," by Aerojet-General Corporation, for U.S. Dept. of Interior Office of Saline Water, Received in Patent Office April 10, 1964, Distributed by U.S. Dept. of Commerce, Office of Technical Services, Washington, D.C. FIGURES 17–19 relied on.

REUBEN FRIEDMAN, *Primary Examiner.*

F. SPEAR, *Assistant Examiner.*